US012779510B2

(12) United States Patent
Koifman et al.

(10) Patent No.: US 12,779,510 B2
(45) Date of Patent: Nov. 3, 2026

(54) SLIDE CLEANING APPARATUS AND METHOD

(71) Applicant: Leica Biosystems Melbourne Pty Ltd, Mt. Waverley (AU)

(72) Inventors: Alex Koifman, Fitzroy (AU); Pavel Dzitac, Berwick (AU); Michael Houston Drummond, Glen Waverley (AU)

(73) Assignee: Leica Biosystems Melbourne Pty Ltd, Mount Waverley (AU)

(*) Notice: Subject to any disclaimer, the term of this patent is extended or adjusted under 35 U.S.C. 154(b) by 147 days.

(21) Appl. No.: 18/722,806

(22) PCT Filed: Dec. 22, 2022

(86) PCT No.: PCT/AU2022/051565
§ 371 (c)(1),
(2) Date: Jun. 21, 2024

(87) PCT Pub. No.: WO2023/115139
PCT Pub. Date: Jun. 29, 2023

(65) Prior Publication Data
US 2025/0041912 A1 Feb. 6, 2025

(30) Foreign Application Priority Data
Dec. 23, 2021 (AU) ................................ 2021904243

(51) Int. Cl.
*B08B 5/02* (2006.01)
*B01D 46/10* (2006.01)
(Continued)

(52) U.S. Cl.
CPC ................ *B08B 5/02* (2013.01); *B01D 46/10* (2013.01); *B01L 13/02* (2019.08); *B08B 11/02* (2013.01);
(Continued)

(58) Field of Classification Search
CPC ........... B08B 5/02; B08B 11/02; B08B 15/04; B08B 2205/00; B08B 6/00; B08B 15/02;
(Continued)

(56) References Cited

U.S. PATENT DOCUMENTS

| | | | | |
|---|---|---|---|---|
| 10,302,665 B2 * | 5/2019 | Reinhardt | ................ | G01N 1/36 |
| 2004/0029258 A1 * | 2/2004 | Heaney | .................. | B01L 9/527 435/287.2 |

(Continued)

FOREIGN PATENT DOCUMENTS

| | | |
|---|---|---|
| CN | 213645291 U | 7/2021 |
| CN | 113495025 A | 10/2021 |

(Continued)

OTHER PUBLICATIONS

International Search Report and Written Opinion for PCT Application No. PCT/AU2022/051565, dated Feb. 7, 2023, 8 pages.

(Continued)

*Primary Examiner* — Alexander Markoff
(74) *Attorney, Agent, or Firm* — Kinney & Lange, P.A.

(57) ABSTRACT

An apparatus for removing contaminants from a slide comprises a manifold including at least one input port and at least one output port in fluid communication with the at least one input port, the at least one output port being adapted to direct a flow of gas onto a surface of the slide such that the flow of gas removes contaminants from the slide; an aperture for receiving the slide; and an enclosure adapted to capture the contaminants removed from the slide.

19 Claims, 15 Drawing Sheets

(51) Int. Cl.
*B08B 11/02* (2006.01)
*B08B 15/04* (2006.01)
*B25J 11/00* (2006.01)

(52) U.S. Cl.
CPC ........... *B08B 15/04* (2013.01); *B25J 11/0085* (2013.01); *B01L 2200/02* (2013.01); *B01L 2300/0681* (2013.01); *B08B 2205/00* (2013.01)

(58) Field of Classification Search
CPC ..... B01D 46/10; B01L 13/02; B01L 2200/02; B01L 2300/0681; B01L 2200/0668; B01L 9/52; B01L 13/00; B25J 11/0085; B25J 15/0616; G02B 27/0006; G02B 21/34; G01N 2035/00039; G01N 2035/00138; G01N 1/28
See application file for complete search history.

(56) References Cited

U.S. PATENT DOCUMENTS

| | | | | |
|---|---|---|---|---|
| 2004/0037739 | A1* | 2/2004 | McNeely | B01L 3/5085 422/417 |
| 2005/0042768 | A1* | 2/2005 | Fredrick | B82Y 30/00 422/560 |
| 2005/0214854 | A1* | 9/2005 | Dahm | B01L 3/502 435/287.2 |
| 2006/0166371 | A1* | 7/2006 | Testa | G01N 1/31 436/174 |
| 2012/0134894 | A1* | 5/2012 | Neef | G01N 1/312 422/500 |
| 2012/0230886 | A1* | 9/2012 | Henry | B01L 3/5027 422/502 |
| 2014/0273078 | A1* | 9/2014 | Guy | G01N 1/34 435/40.5 |
| 2016/0107159 | A1* | 4/2016 | Gong | B01L 3/567 435/6.12 |
| 2016/0339427 | A1* | 11/2016 | Wiktor | B01L 3/50851 |
| 2021/0001343 | A1* | 1/2021 | Imrali | B01L 9/52 |
| 2021/0069719 | A1* | 3/2021 | Shah | B01L 3/502 |
| 2021/0172968 | A1* | 6/2021 | Gaertner | B01L 3/50273 |

FOREIGN PATENT DOCUMENTS

| | | | |
|---|---|---|---|
| EP | 1605245 | A2 | 12/2005 |
| EP | 3076182 | A1 | 10/2016 |
| EP | 3809112 | A1 | 4/2021 |

OTHER PUBLICATIONS

Extended European Search Report for European Patent Application No. 22908901.6, dated Mar. 25, 2025, 11 pages.

* cited by examiner

SLIDE CLEANING APPARATUS AND METHOD

CROSS REFERENCE TO RELATED APPLICATION(S)

This application is the national phase of PCT Application No. PCT/AU2022/051565 filed on Dec. 22, 2022, which claims priority from Australian Provisional Patent Application No. 2021904243 filed on 23 Dec. 2021, the contents of which are to be taken as incorporated herein by this reference.

TECHNICAL FIELD

The present disclosure relates to a slide (or substrate) cleaning apparatus and method of use for use in a laboratory environment and the like. In particular, the present disclosure relates to an apparatus and associated method for removing contaminants such as debris from the surface of a slide (or substrate).

BACKGROUND

In a laboratory setting, a persistent problem is the collection of debris and contaminants on the surface of a slide. This has been found to originate from a number of sources ranging from general contaminants in the environment, to glass particles which can originate from the slide itself. These glass particles are typically a result of rough edges that can form during the manufacturing process of the slide resulting in fragments which can dislodge with the handling of the slide.

These contaminants can result in slide breakage (or loss of slide custody) when handling the slide using automated slide handling instrumentation.

It would be desirable to overcome or ameliorate one or more of the issues surrounding contaminants on the slide surface, which can in certain circumstances lead to slide breakage or loss of slide custody.

A reference herein to a patent document or any other matter identified as prior art, is not to be taken as an admission that the document or other matter was known or that the information it contains was part of the common general knowledge as at the priority date of any of the claims.

SUMMARY

One aspect of the present disclosure provides an apparatus for removing contaminants from a slide, the apparatus comprising: a manifold including at least one input port and at least one output port in fluid communication with the at least one input port, the at least one output port being adapted to direct a flow of gas onto a surface of the slide such that the flow of gas removes contaminants from the slide; an aperture for receiving the slide; and an enclosure adapted to capture the contaminants removed from the slide.

In some embodiments, the enclosure is removably attachable to the apparatus.

In some embodiments, the at least one output port comprises one or more nozzles each having a diameter of about 0.5 mm to about 1.5 mm.

In some embodiments, the at least one output port comprises one or more nozzles each having a diameter of about 1 mm.

In some embodiments, the at least one input port is adapted to removably receive a gas line.

In some embodiments, the gas line is connected to a gas source being adapted to supply gas at a pressure of between about 40 KPa and about 60 KPa.

In some embodiments, the enclosure is substantially P-shaped, with a base of the P being adapted to capture the contaminants.

In some embodiments, the enclosure includes at least one opening to allow for passage of the gas out of the enclosure.

In some embodiments, the at least one opening contains a mesh configured to intercept particulate contaminates removed from the slide.

In some embodiments, the mesh is comprised of apertures configured to intercept particles having a size greater than about 0.4 mm.

In some embodiments, the mesh is removable from the at least one opening of the enclosure.

In some embodiments, the mesh is constructed of stainless steel.

In some embodiments, the mesh is constructed of a polymer.

In some embodiments, the apparatus further includes a guide for guiding the slide into the enclosure.

In some embodiments, the guide comprises opposing ledges or slots.

In some embodiments, the apparatus further comprises a mounting means for mounting the apparatus within a sample processing instrument.

In some embodiments, the mounting means comprises two or more recesses on the manifold configured to receive mounting projections within the sample processing instrument.

In some embodiments, the mounting means comprises two or more projections on the manifold configured to cooperate with two or more recesses in a mounting surface within the sample processing instrument.

Another aspect of the present disclosure provides a sample processing instrument comprising the apparatus.

A further aspect of the present disclosure provides a method for removing contaminants from a slide, the method comprising the steps of: inserting the slide into an enclosure of a slide-cleaning apparatus; applying a flow of gas at a predetermined pressure and/or flow rate to a surface of the slide to remove contaminants; and removing the slide from the apparatus.

In some embodiments, the method further includes the step of adjusting the height of the slide for insertion into the apparatus.

In some embodiments, the predetermined pressure is between about 40 KPa and about 60 KPa.

In some embodiments, the method is performed within a sample processing instrument having a slide handling robot, and wherein the robot is configured to transfer a slide from a first location in the instrument into the slide-cleaning apparatus for removal of contaminants.

In some embodiments, the slide handling robot adjusts the height of the slide before insertion of the slide into the slide-cleaning apparatus In some embodiments, the slide handling robot removes the slide from the apparatus after removal of the contaminants.

In some embodiments, the method is performed using the slide-cleaning apparatus.

BRIEF DESCRIPTION OF DRAWINGS

Embodiments of the present disclosure will now be described, by way of example only, with reference to the accompanying drawings, in which.

DETAILED DESCRIPTION

Figure 1:
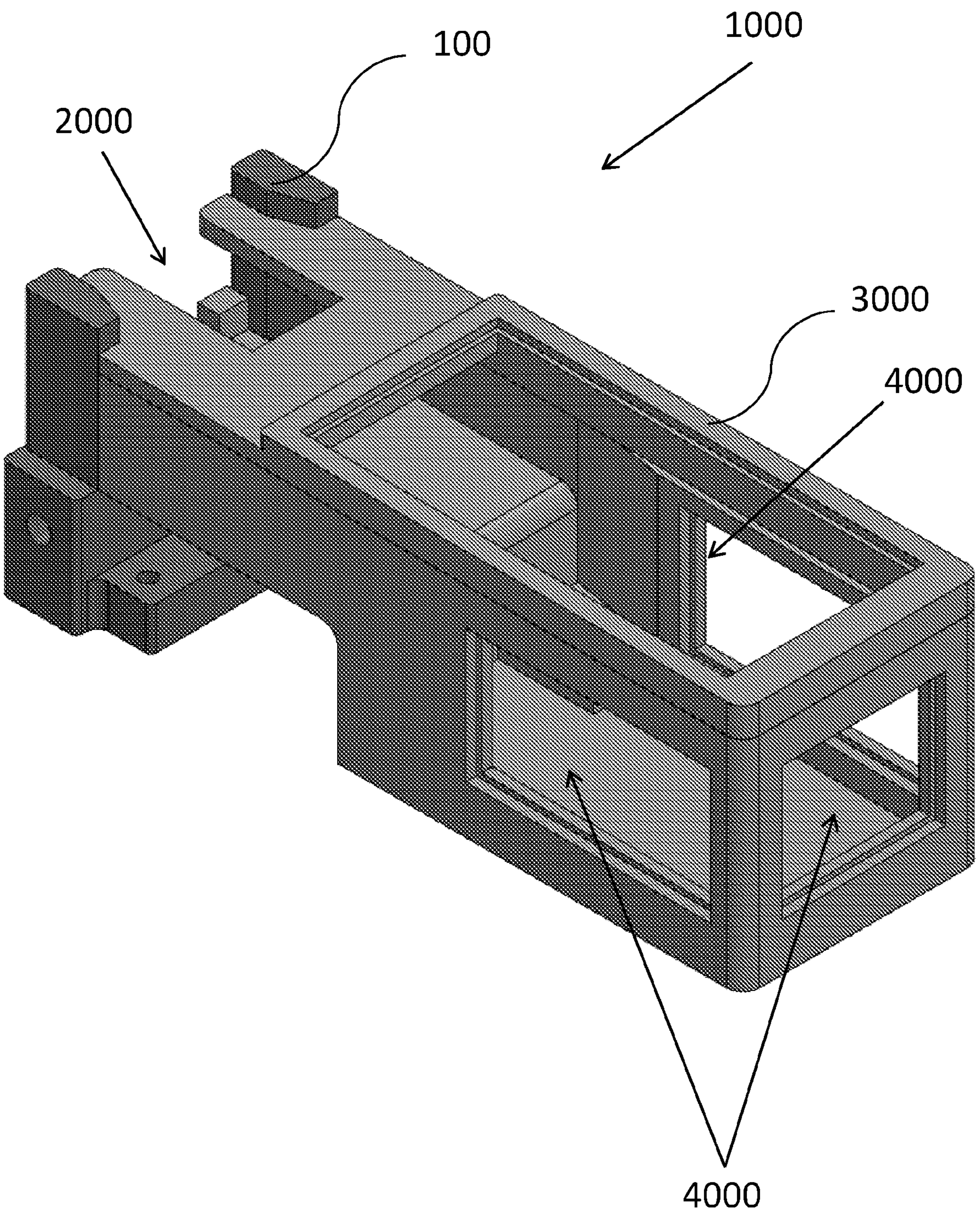
FIG. 1 is a perspective view of the slide cleaning apparatus.
Figure 5:
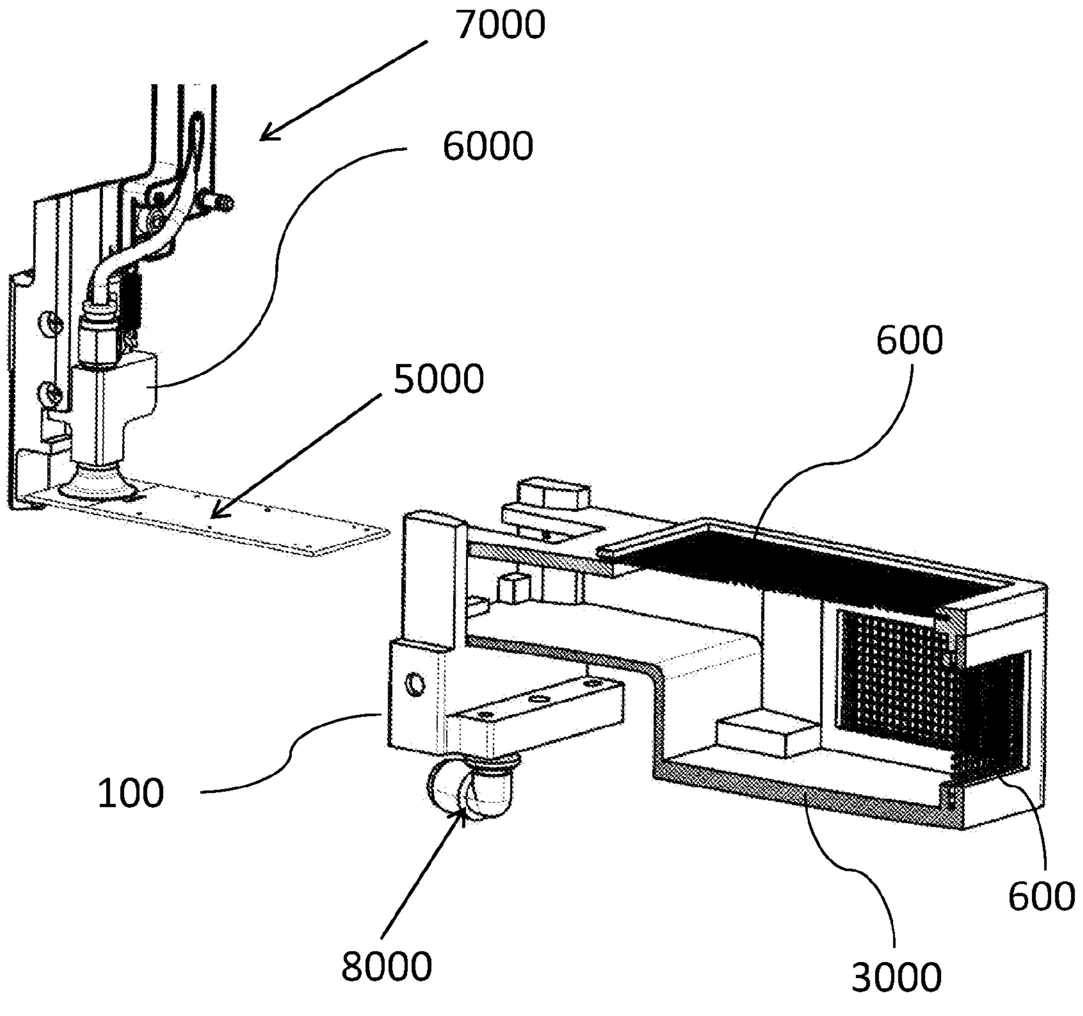
FIG. 5 is a perspective view of the slide cleaning apparatus also showing a robotic head transporting a slide toward the opening of the slide cleaning apparatus.
Figure 6:
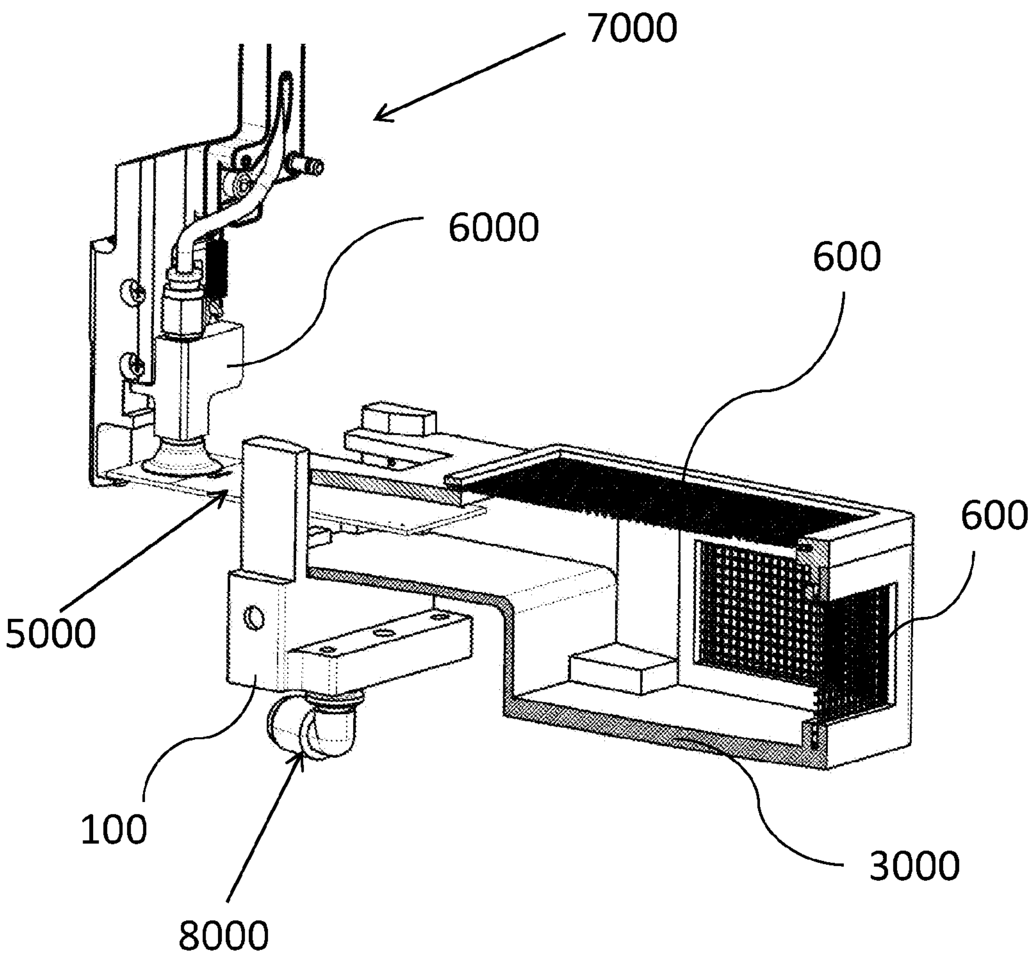
FIG. 6 is another perspective view of the slide cleaning apparatus in FIG. 5 with the slide being advanced into the apparatus.
Figure 7:
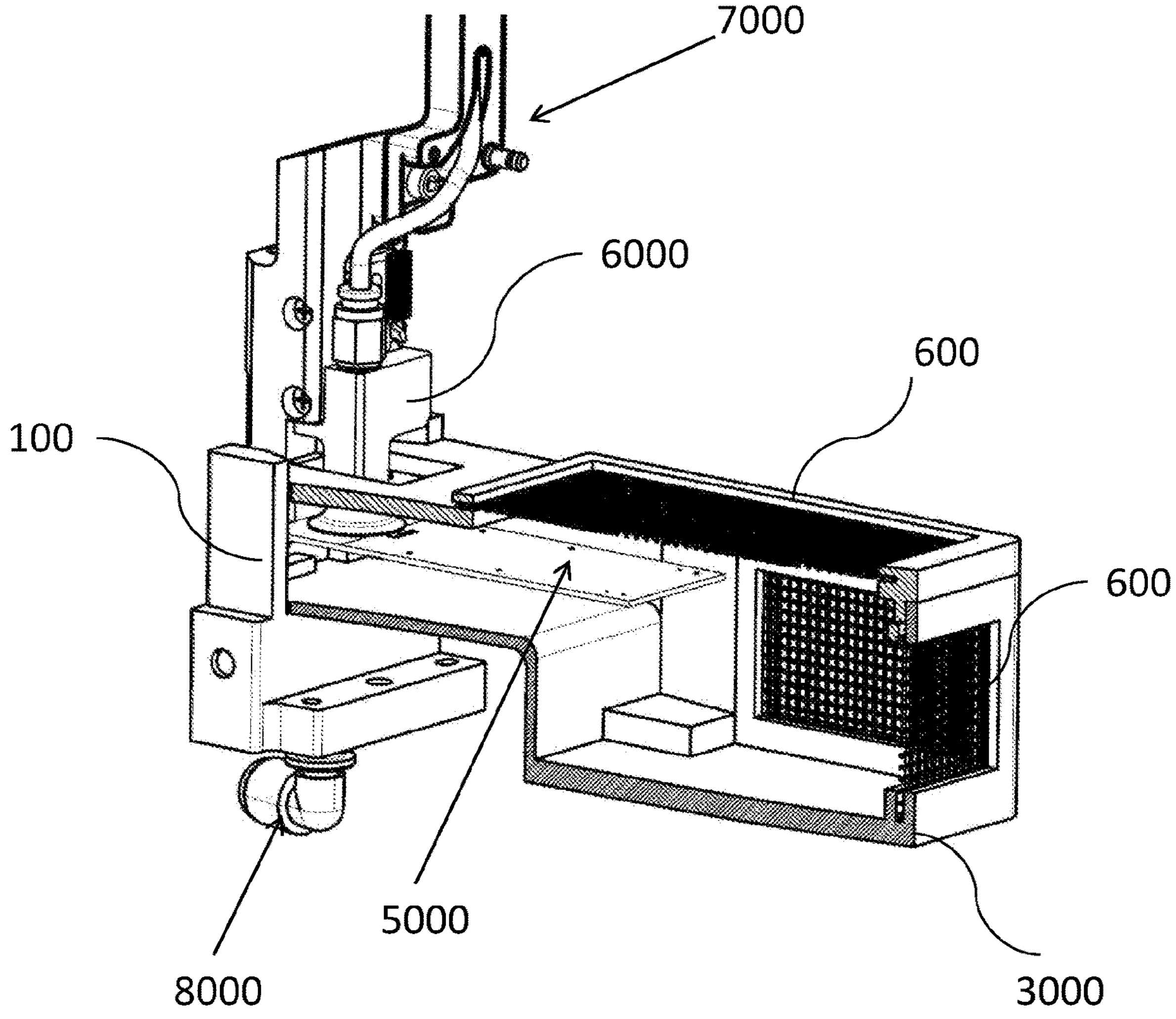
FIG. 7 is another perspective view of the slide cleaning apparatus in FIGS. 5 and 6 showing the slide located in the apparatus for cleaning.
Figure 8:
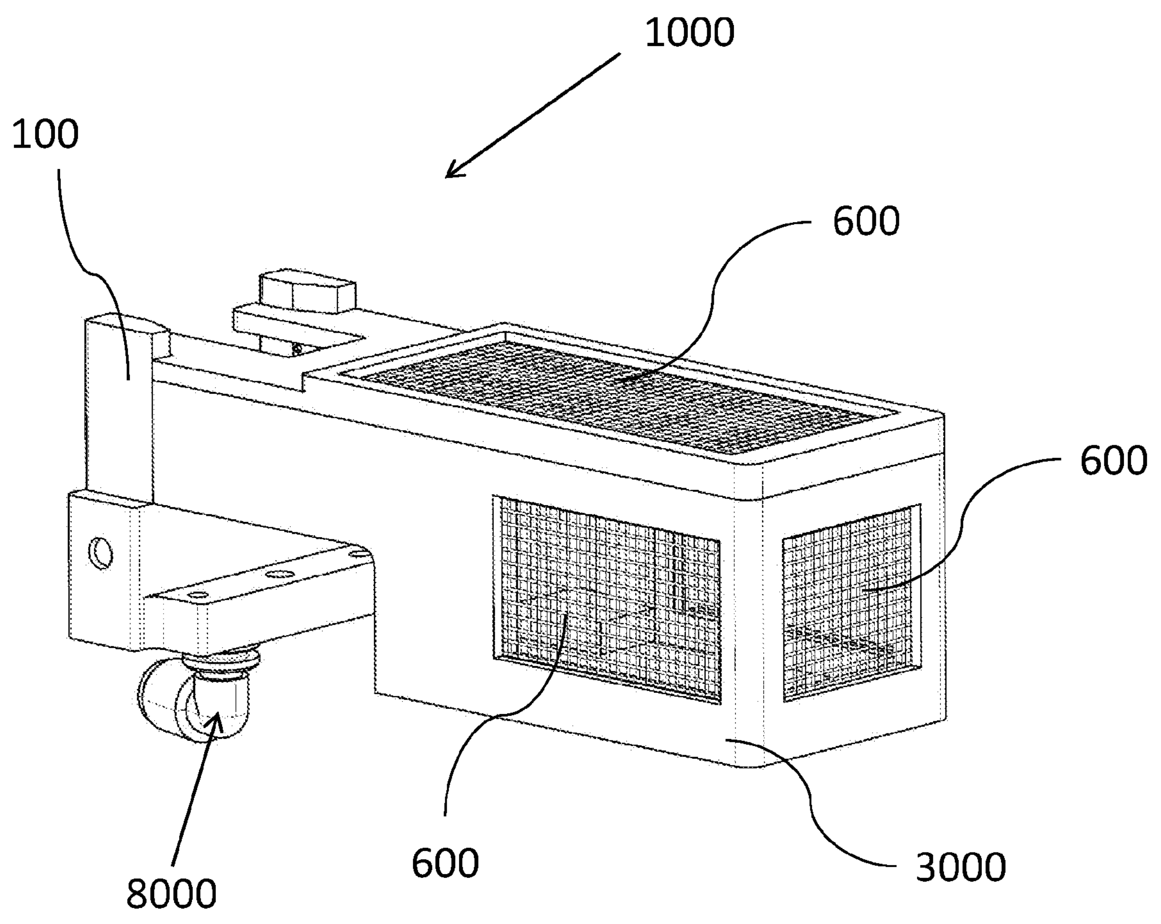
FIG. 8 is a perspective view of the slide cleaning apparatus with the mesh in situ.

A slide cleaning apparatus 1000 for removing contaminants such as debris from slides (or a substrate) is shown in FIG. 1. As can be seen in FIG. 1, the slide cleaning apparatus 1000 includes a manifold 100 and an enclosure 3000. The enclosure 3000 is adapted to capture contaminants from the slide 5000 (shown in FIGS. 5 to 7) that are removed in the cleaning process.

Figure 2:
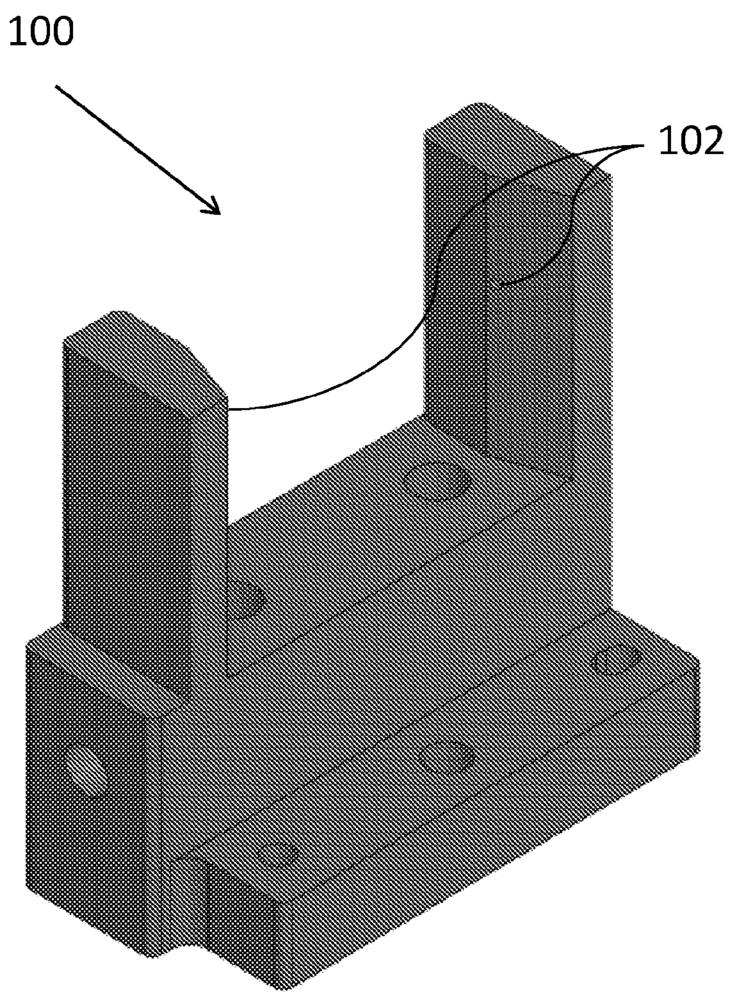
FIG. 2 is a perspective view of a manifold detached from the enclosure of the slide cleaning apparatus.
Figure 3:
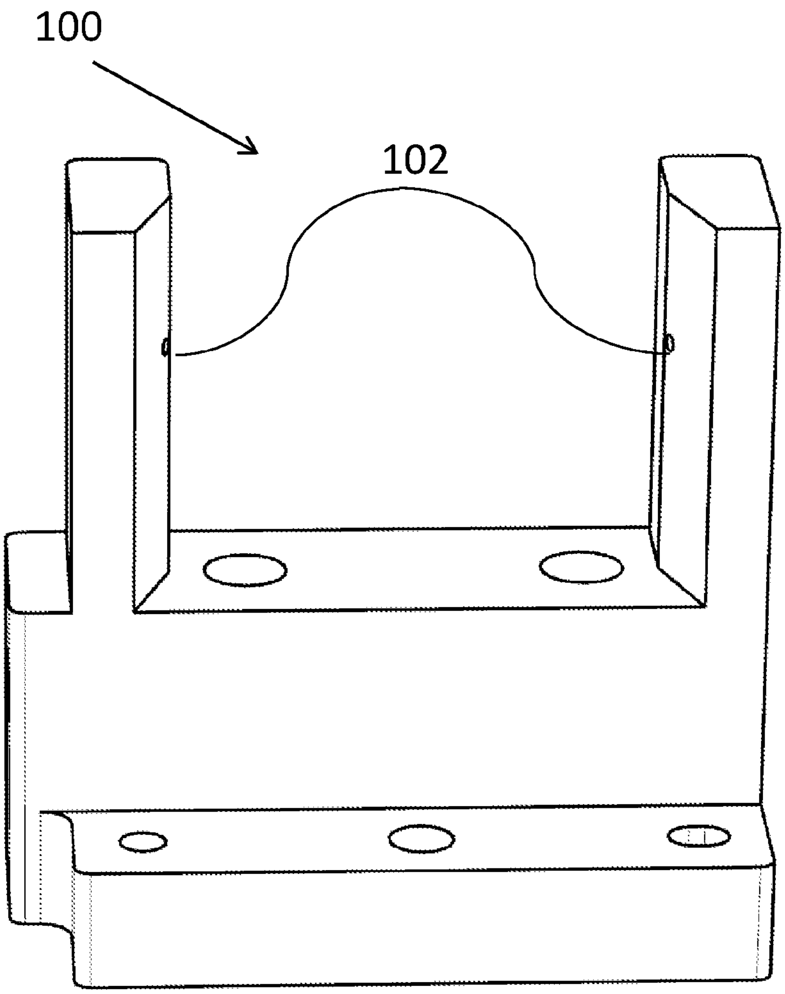
FIG. 3 is a front view of the manifold.
Figure 4:
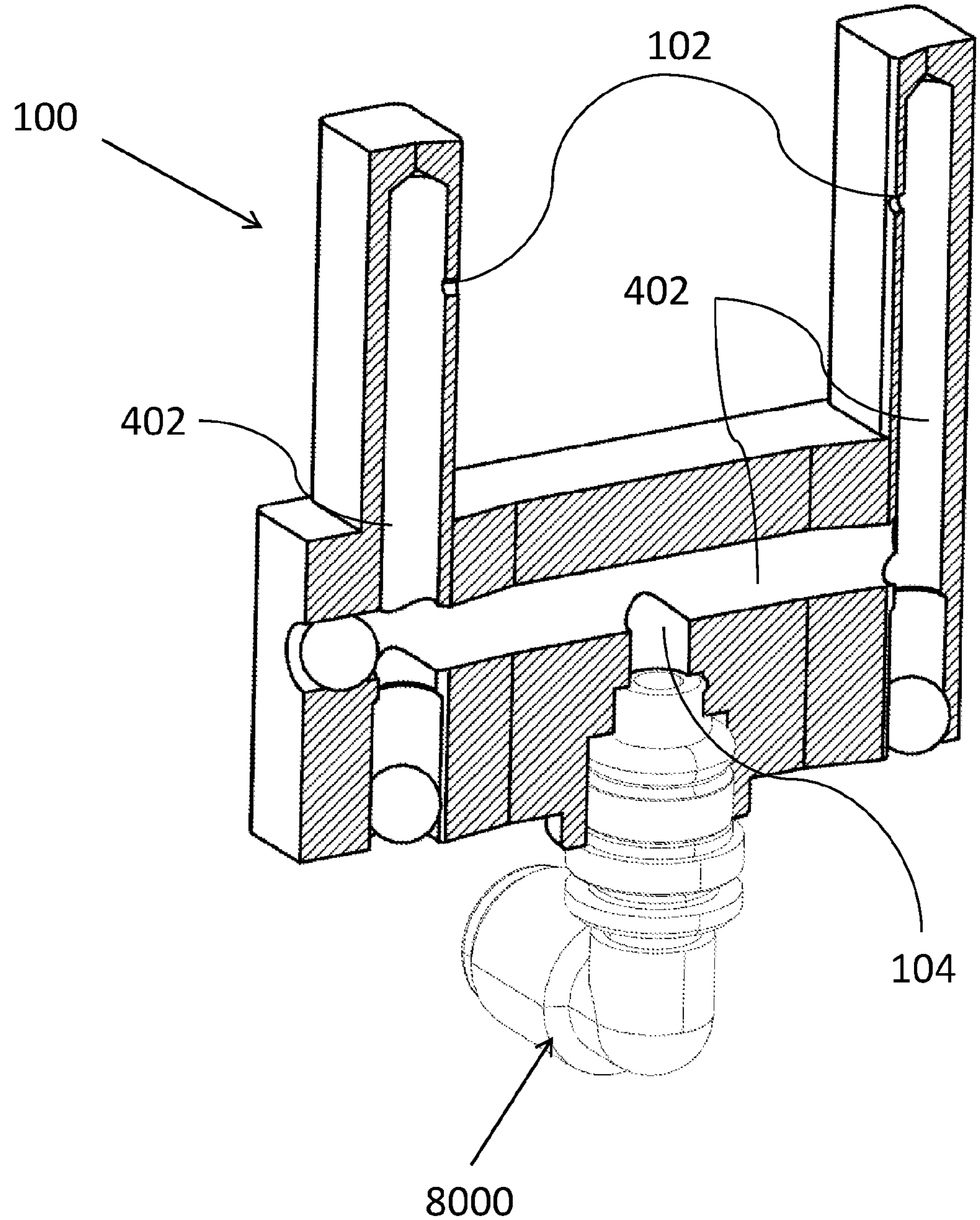
FIG. 4 is a cut away perspective view of the manifold detached from the enclosure of the slide cleaning apparatus and attached to a connector for fluid coupling with a gas source.

With reference to FIGS. 2 to 4, the manifold 100 includes at least one input port 104 (shown in FIG. 4) and at least one output port 102 in fluid communication with the at least one input port 104. The at least one output port 102 is adapted to direct a flow of gas onto a surface of the slide 5000 such that the flow of gas removes contaminants from the slide 5000. The apparatus 1000 includes an aperture 2000 for receiving the slide 5000 which in the embodiment shown, is provided as part of the manifold 100. In order to capture contaminants, the apparatus 1000 includes an enclosure 3000 adapted to capture the contaminants removed from the slide 5000.

The at least one output port 102 may comprise openings or nozzles (not shown) adapted to direct the gas (such as air) precisely onto the surface of the slide 5000 to facilitate the removal of contaminants. In some embodiments, the nozzles may have an opening diameter of about 0.2 mm to about 1.5 mm or more preferably about 1.1 mm. The diameter may be chosen to provide sufficient jet flow that will allow for the removal of the debris from the slide 5000 while preventing too much flow of gas which may damage the slide 5000. As alluded to previously, the nozzles may be an integral part of the manifold 100 or may be removable by way of a threaded fixture or a press fit into the manifold 100 as some examples.

Examples of contaminants may include debris or particulate matter which, when left on the surface of the slide 5000 may interfere with operation of an instrument configured to process samples on the slide 5000 resulting in breakage or loss of slide custody e.g. by a robotic arm or automated device. Such contaminants may include, for example, glass particles and dust among other things.

It is envisaged that the slide cleaning apparatus 1000 could be used as a stand alone device or in conjunction with slide processing instruments or systems configured to substantially automate processing of samples, such as biological samples, carried by or applied to the slides 5000. Thus, the slide cleaning apparatus 1000 may be a separate component provided outside a slide processing instrument, or it may be incorporated into such an instrument in a manner which provides for integration of slide cleaning using the apparatus 1000 into the slide processing procedure. An example of such an arrangement follows.

The slide cleaning apparatus 1000 may be formed from a single unitary piece of e.g. polymeric, ceramic or metallic construction. In other embodiments, the slide cleaning apparatus 1000 may be formed of individual parts that are separable wherein, for example the manifold 100 is detachable from the enclosure 3000 as is shown in FIGS. 2 to 4.

The manifold 100 includes at least one output port 102 and in some embodiments, may include many output ports. With reference to FIG. 4, the manifold 100 as shown includes two output ports 102. The manifold 100 provides fluid communication between output ports 102 and the at least one input port 104 to facilitate the flow of gas from the input port 104 to the output ports 102 through channels 402.

The output ports 102 are adapted to direct a flow of gas onto a surface of slide 5000 for removal of contaminants from the slide 5000. The flow of gas provides sufficient pressure and flow rate to remove contaminants from the surface of the slide 5000. Typically, the contaminants comprise of solid particulate matter but may include waxes or fluids, such as water, alcohol, reagents, etc.

The two output ports 102 in the embodiment shown, allow for substantially even distribution of gas onto the slide surface, thus providing an effective means for removing contaminants in the form of particles, debris and other residues from the slide surface. The output ports 102 may form an integral part of the manifold 100 or alternatively may be a press fit or threaded port that is removable from the manifold for the purposes of maintenance or cleaning as two examples. The output ports 102 are ideally angled relative to the direction of insertion of the slide 5000. In some embodiments, the angle is within a range of about 15 degrees to about 25 degrees from a line running perpendicular to the direction of slide insertion. More preferably the angle is about 20 degrees from the perpendicular. This also avoids collision of jet flows in an arrangement where both output ports 102 are directed inward and orthogonal to the direction of slide insertion. Instead, the separate jet flows meet and combine to create forward flow effect along the slide 5000, when inserted.

In some embodiments, the manifold 100 includes four output ports; two below the slide 5000 and two above the slide 5000 when inserted into the apparatus 1000, allowing for simultaneous cleaning of the top and bottom surface of the slide, thus reducing the time to clean the slide 5000.

The apparatus 1000 further includes an aperture 2000 for receiving the slide 5000. Ideally the aperture 2000 for receiving the slide 5000 is formed in the manifold 100. With reference to FIG. 1, the apparatus 1000 includes an enclosure 3000 which is adapted to capture contaminants removed from the slide 5000 by application of the gas. The manifold 100 and enclosure 3000 may be made from a variety of materials such as an injection moulded polymer, 3D printed thermoplastic, a metallic material such as aluminium or cast steel, as a few examples.

In some embodiments the enclosure 3000 may be removably attachable to the manifold 100 which can facilitate cleaning. When in use, the enclosure 3000 captures contaminants and may require periodic cleaning to remove the contaminants from the enclosure 3000 to avoid openings in the mesh from becoming blocked, or avoid blowback of previously collected contaminants. Detachment of the enclosure 3000 from the manifold 100 facilitates cleaning allowing a user to shake contaminants into a bin or other means of disposal.

In some embodiments the openings in the mesh may be arranged to capture particles as small as about 0.8 mm, preferably as small as about 0.6 mm, more preferably as small as about 0.4 mm and in some cases, particles as small as about 0.2 mm may be removed by the apparatus and intercepted by the mesh openings.

This removable attachment of the manifold 100 from the enclosure 3000 may be by way of a friction fit attachment where the enclosure 3000 and manifold 100 may be separated by applying a force to separate the enclosure 3000 from the manifold 100. In other embodiments the manifold 100 may be fixed to the enclosure 3000 using a fastener such as a screw or a bolt arrangement or alternatively a dowel and recess arrangement. In other embodiments, it is envisaged that the manifold 100 and enclosure 3000 may be attached using a magnetic coupling or clip/clasp arrangement.

To further facilitate cleaning, the enclosure 3000 and manifold 100 may be rinsed either using a cleaning solution or water/demineralised water to ensure all contaminants are removed from the apparatus 1000 before further use. In other embodiments the enclosure 3000 may be a disposable item which is discarded once it has collected the contaminants removed from the slide 5000 after one or several uses.

Reassembly of the manifold 100 and enclosure 3000 is achieved by aligning the manifold 100 to the enclosure 3000 and recoupling the manifold 100 to the enclosure 3000 by engaging the fastening arrangement as was previously discussed.

Referring to FIG. 4, the at least one input port 104 is adapted to receive a gas line 8000 to provide a source of gas for the apparatus. The gas line 8000 may be permanently attached or removable. The gas line 8000 may be removably connected to the input port using a threaded connector or a releasable connection, such as a snap fit connector.

Typically, the gas line 8000 is connected to a gas source (not shown). The gas source may be configured to deliver an appropriate pressure which in some embodiments may be between about 40 KPa to about 60 KPa and more preferably about 50 KPa to 52 KPa. This range of pressures is chosen to provide sufficient velocity for the flow of gas to dislodge contaminants from the slide 5000 whilst not damaging the slide 5000, or the sample that it carries, in the process.

A person skilled in the art will understand that a variety of different gas sources may be suitable. It will be appreciated that the gas may take a number of forms ranging from compressed air, which is preferably dry, to an inert gas such as argon or nitrogen as some examples. In some embodiments, the gas is cooled to achieve higher gas density which can achieve higher impact force and velocity with lower pressure. As would be understood by a person skilled in the art, one or more of the parameters of the apparatus 1000 including diameter of the output ports 102, flow rate of the gas delivered and pressure of gas in the gas line 8000 can influence the pressure at the outlet ports which in turn influences impact force and velocity of the flow of gas.

In other embodiments the gas source includes an ionizing probe adapted to impart electrical charge to the gas thus preventing the build-up of static electricity which can cause charged contaminants to stick to the surface of the slide 5000.

In the embodiment shown, the enclosure 3000 has a substantially P-shaped design which is adapted to capture contaminants that have been removed from the slide 5000 within the basin formed by the loop of the P. With use, the contaminants removed from the slide 5000 will collect in the basin. As described above, collected contaminants can be removed periodically by cleaning the enclosure 3000. Other designs for the enclosure 3000 may be suitable ranging from a substantially rectangular shape or an L-shaped design, where the debris would be collected within the base of the L-shaped region. The L-shaped region differs in functionality from the P-shaped region in the ability to capture contaminants, with the P-shaped region providing rounder edges and thus facilitating cleaning whereas with the L-shaped region the sharper corners may be more prone lodging contaminants inside the corner areas making cleaning more difficult.

As is exemplified in FIG. 1, the enclosure 3000 includes at least one opening 4000. In the embodiment shown there are four openings 4000. The openings 4000 are adapted to allow for the flow of gas from the manifold 100 through the apparatus 1000 to reduce back pressure that would occur if the enclosure 3000 was fully enclosed. As is exemplified in FIGS. 5 to 9, the one or more openings 4000 include a mesh 600 or other screen to prevent escape of contaminants removed from the slide 5000. Alternatively, the openings 4000 could include small apertures or slits integral to the enclosure 3000 and having an appropriate size that prevents the contaminants from escaping from the enclosure 3000.

In the embodiment shown, and as previously discussed, the enclosure includes a plurality of mesh sections 600 as is shown in FIGS. 5 to 9. In the embodiment shown, the mesh 600 is inserted into the openings 4000 of the enclosure 3000 to allow for out flow of gas while minimising risk of any contaminants removed from the slide escaping from the enclosure 3000. In the embodiment shown, the mesh 600 is removable from the enclosure for the purposes of maintenance and cleaning or replacement.

It should be noted that in some embodiments, the mesh 600 may form an integral part of the enclosure 3000 and thus not be removable.

The mesh 600 may be constructed from a range of materials including metals and metal alloys such as stainless steel and aluminium, polymers, textiles and the like. It is preferable that the mesh 600 is resistant to corrosion. In the case of the mesh 600 being constructed from a metal or metal alloy, the mesh 600 may be created by taking a fine mesh wire and weaving the wire into a mesh. Alternatively, metal stamping techniques may be utilised in which the apertures of the mesh 600 are punched through a thin metal sheet during manufacturing. Laser cutting and other techniques may also be utilised as would be understood by one of skill in the art.

The mesh 600 comprises of apertures that are large enough to facilitate air flow from the manifold 100 out of the enclosure 3000. This is desirable to prevent backflow which could impede the effective removal of contaminants from the slide 5000. Furthermore, the apertures in the mesh 600 need to be small enough to prevent contaminants collected from the slide from escaping through the mesh 600. In the embodiment shown, the mesh 600 is comprised of apertures that are configured to intercept particles having a size greater than about 0.4 mm.

In some embodiments, the mesh 600 is removable from at least one opening 4000 of the enclosure 3000 to facilitate cleaning and maintenance such as by replacement of worn or clogged mesh. The mesh 600 is preferably slidably removable, where the mesh 600 would be inserted into slots within the openings 4000 of the enclosure 3000. Alternatively, the mesh 600 may be mounted on the outer (or inner) faces of the enclosure 3000 and attached using a fastening means such as pins or screws to attach the mesh 600 to either the outer or inner face of the enclosure.

Figure 9:
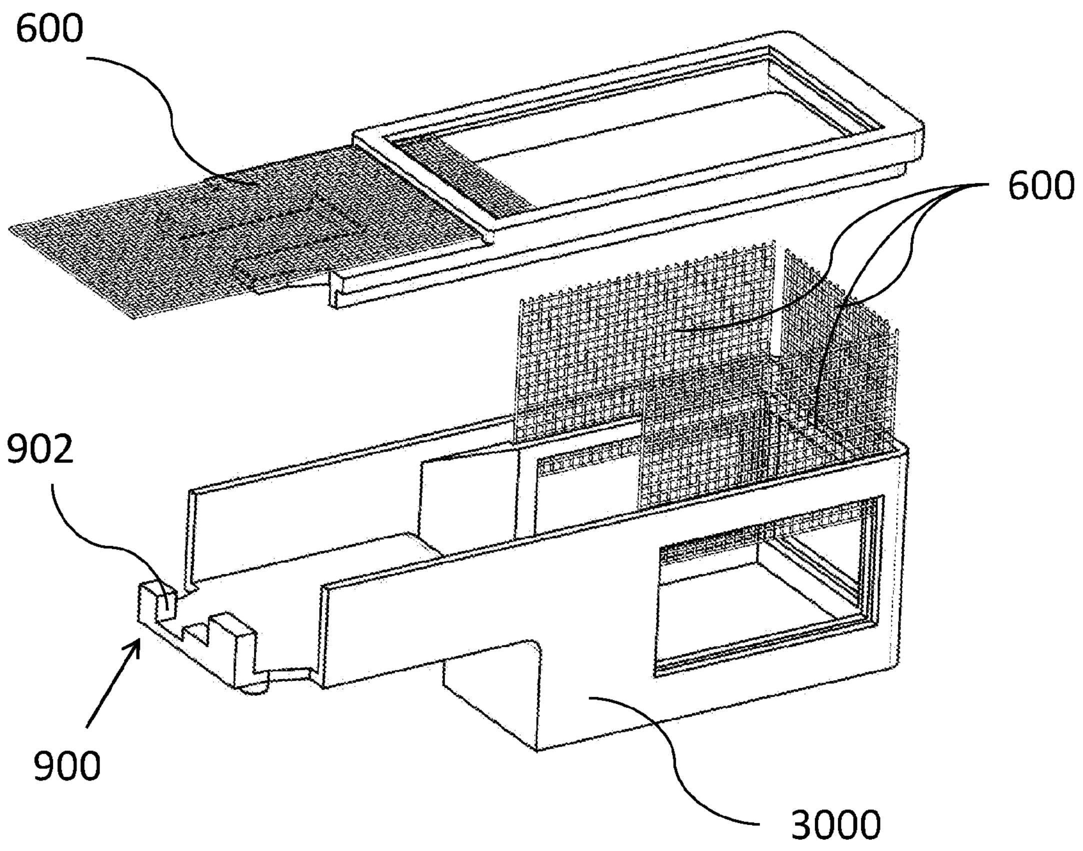
FIG. 9 is an exploded view of the enclosure of the slide cleaning apparatus with the mesh sections partially removed.

In some embodiments, the apparatus 1000 may include a guide 900 as shown in FIG. 9 for guiding the slide 5000 into the enclosure 3000. The guide 900 may include opposing edges or slots 902 to aid in guiding the slide 5000 into the enclosure 3000. The guide 900 is intended to facilitate the accurate insertion of the slide 5000 into the apparatus facilitating accurate alignment of the slide 5000 in relation to the apparatus 1000 upon insertion. This may have particular utility in automated systems in which a robotic arm has custody of the slide 5000 which is guided into the apparatus 1000 (see FIGS. 6 to 7). Thus, the guide 900 may be adapted to cooperate with and guide the slide 5000 itself, or to cooperate with a component of a robotic arm, for example, which guides the slide 5000 into the apparatus.

Figure 10:
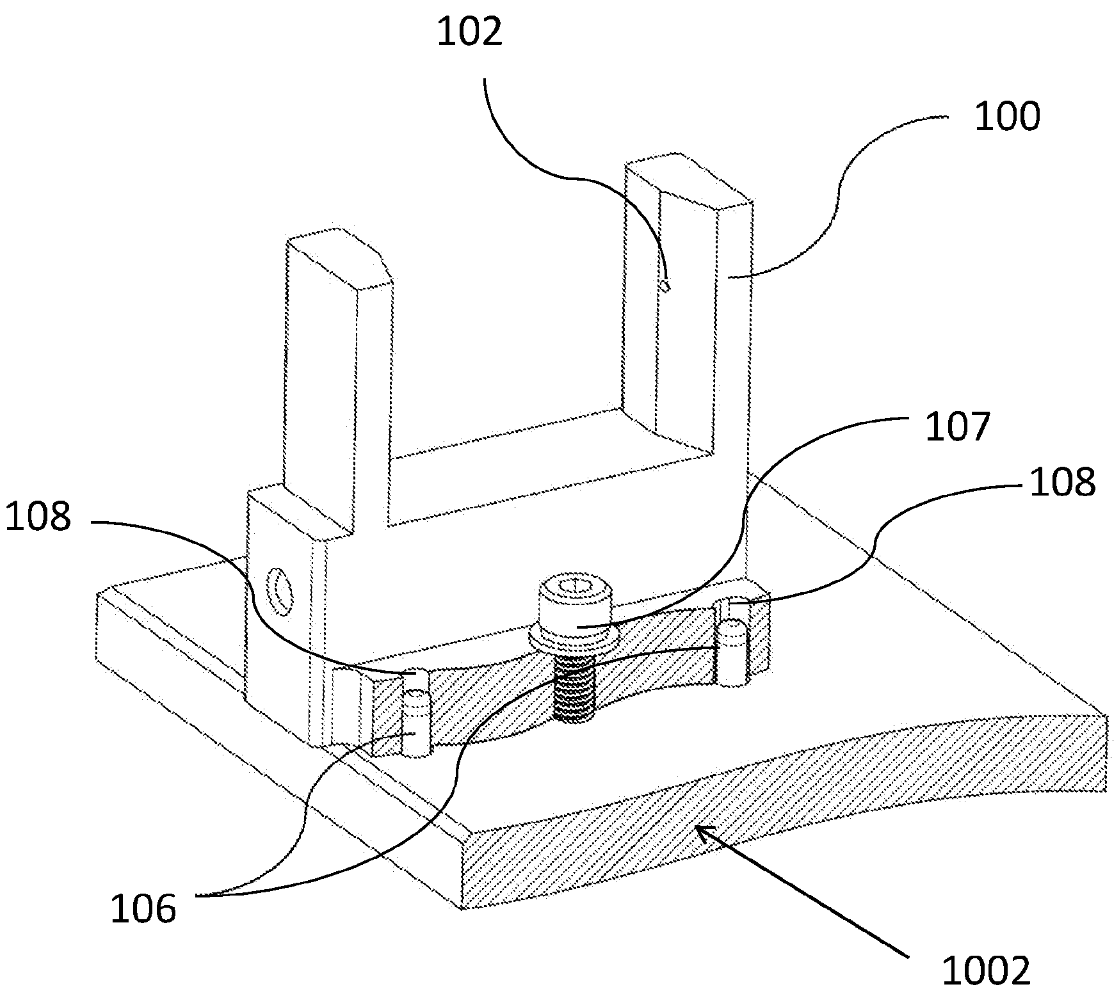
FIG. 10 is a perspective view of the manifold mounted to a sample processing instrument.

With reference to FIG. 10, in some embodiments, the apparatus 1000 further includes a mounting means for mounting the apparatus 1000 within a sample processing instrument. The mounting means may comprise two or more recesses 108 on an under surface of the apparatus 1000 (such as on the manifold 100 and/or the enclosure 3000) which are configured to receive corresponding upwardly extending mounting projections 106 located on a base plate 1002 of the sample processing instrument to which the apparatus 1000 is mounted.

The mounting projections 106 may comprise e.g. short dowels, pins or pegs or the like. Alternatively, the mounting means may comprise two or more projections located on an under surface of the apparatus 1000 (such as on the manifold 100 and/or the enclosure 3000 which are configured to be received in corresponding recesses located in a base plate 1002 of the sample processing instrument to which the apparatus 1000 is mounted. In still further embodiments the mounting means may provide a clasp, clip, magnetic or other fastener for fixedly locating the apparatus 1000 within a sample processing instrument. In the embodiment shown in FIG. 10, the mounting means further includes a threaded bolt arrangement 107 for fastening the manifold 100 to the base plate 1002. In some embodiments, the one or more recesses 108, comprises a hole and a slot arrangement that is adapted to cooperate with the mounting projections 106, the slot allowing for tolerance when mounting the manifold to the base plate 1002.

The mounting means accurately positions the apparatus 1000 within the sample processing instrument. This is beneficial in automated instruments utilising robotic elements to move slides within the instrument since the mounting means provide precise datum points for removal and replacement of the slide cleaning apparatus 1000. This enables the robotic arm 6000, shown in FIG. 15, to reliably locate the apparatus 1000 for placement of slides 5000 for cleaning, with reduced risk of colliding with the apparatus 1000 due to misalignment.

Figure 11:
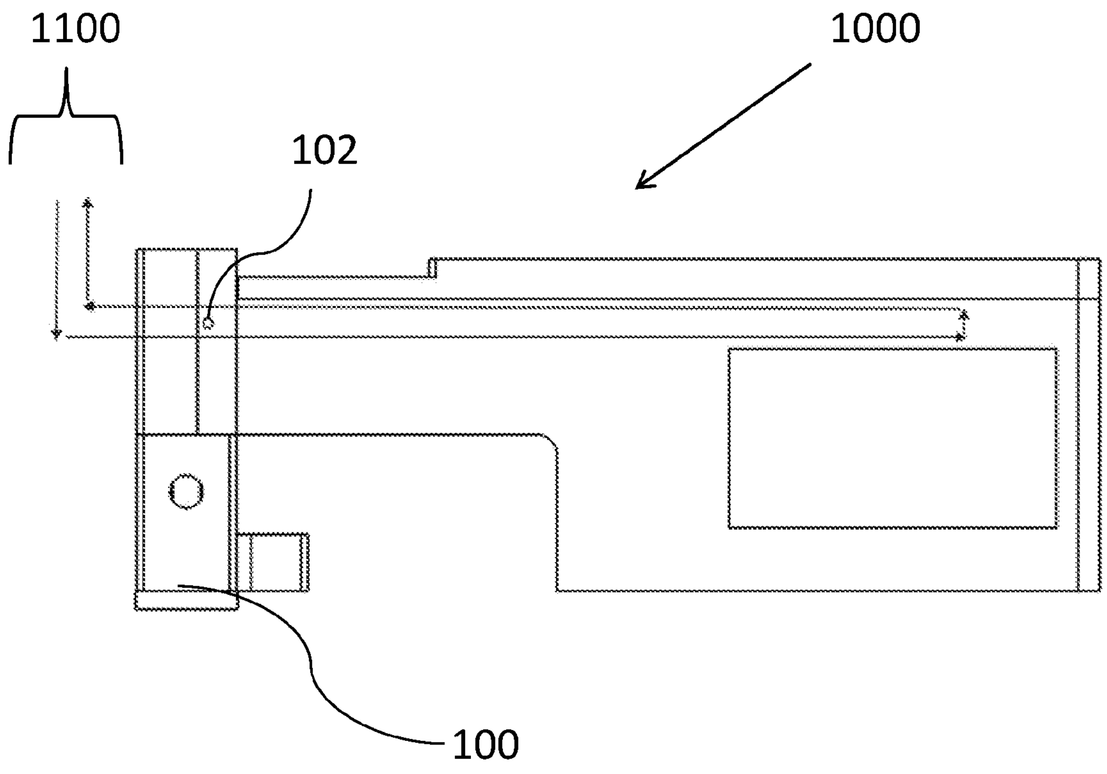
FIG. 11 is a side view of the slide cleaning apparatus showing the path that a slide takes through the apparatus.

FIG. 11 shows an example of a path that the slide 5000 may take through the apparatus 1000 in order for contaminants to be removed from both upper and lower surfaces. The path is shown by the arrows 1100. Movement of the slide 5000 along the slide path 1100 is achieved by the robotic arm 6000 (shown in FIG. 12) which has custody of the slide 5000. In some embodiments, the robotic arm 6000 utilises a suction device 6002 to releasably hold the slide. The suction device 6002 may include a suction cup or a bellowed suction cup although the robotic arm 6000 may alternatively use other devices to releasably hold the slides, such as a grasper or pincer.

In embodiments using a suction device 6002, a vacuum is applied through the suction device to pick up and retain custody of the slide 5000. The vacuum is achieved using a source of negative air pressure (not shown). The robotic arm 6000 retains custody of the slide 5000 as it travels path 1100 through apparatus 1000.

As is shown in FIG. 11, the path taken by the slide 5000 travels past the at least one output port 102 at a height lower than the at least one output port 102 to clean a top surface of the slide 5000. In some embodiments, the slide height is approximately 1 mm below the at least one output port 102 although a height of up to about 5 mm below the at least one output port 102 is also contemplated. The robotic arm 6000 advances the slide 5000 into apparatus 1000 such that the length of the slide capable of insertion into the apparatus receives a flow of gas from the at least one output port 102 to clean a top surface of the slide 5000.

Still referring to FIG. 11, once the slide 5000 has travelled along its length capable of insertion into the apparatus 1000, the robotic arm adjusts the slide 5000 height to above, e.g. approximately 1 mm above the at least one output port 102 and travels back out of the apparatus 1000. This second movement out of the apparatus 1000 allows the bottom surface of the slide 5000 to be cleaned as it passes above the at least one output port 102, thus cleaning both bottom and top surfaces of the slide 5000. It will be appreciated by a person skilled in the art, that the bottom surface of the slide 5000 may be cleaned first followed by the top surface as an alternative.

Figure 12:
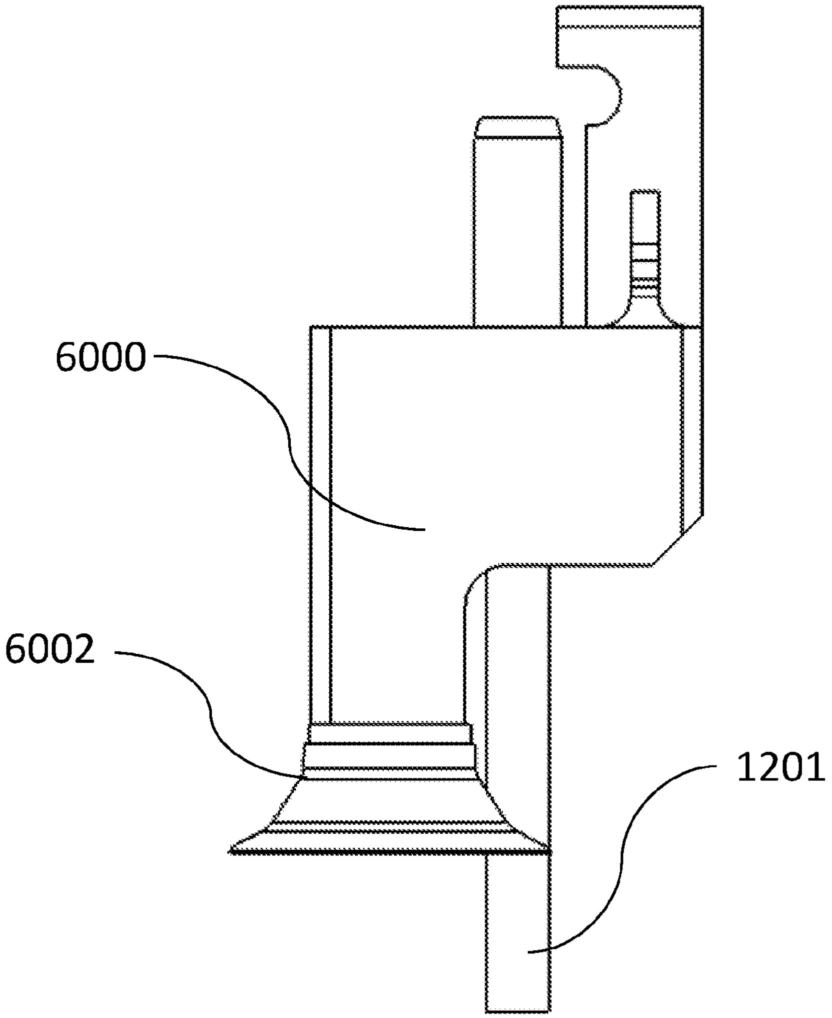
FIG. 12 is a side view of the instrument robot suction arm.

FIG. 12 shows a side view of the robotic arm 6000 which includes a calibration probe 1201. The calibration probe is used primarily to calibrate the position of the robotic arm 6000 to facilitate accurate positioning of the robotic arm 6000 within the apparatus 1000 as will be discussed below. While the embodiment illustrated presents the calibration probe 1201 as part of the robotic arm 6000, it is to be understood that this is for convenience and the calibration probe may be provided by a separate robotic feature of the instrument into which the apparatus 1000 is incorporated.

The calibration probe 1201 provides a means for obtaining a reference point corresponding to a feature of the apparatus 1000 from which a controller operating the robotic arm 6000 calculates slide slight insertion height for cleaning within the apparatus 1000. This is achieved by moving the robotic arm 6000 until the calibration probe 1201 contacts a first horizontal surface of the manifold 100 having known x, y and z coordinates so that the controller of robotic arm 6000 can calibrate its perceived location with the actual location. The frequency of calibration may be pre-programmed into the controller of the robotic arm to which the calibration probe is attached and may form part of e.g. an initialisation procedure of the instrument.

Alternatively/additionally, the robotic arm 6000 may move in an opposing direction until it contacts a second horizontal surface of the manifold 100, or the base plate 1002 of the sample processing instrument to which the apparatus 1000 is mounted. This allows the robot arm 6000 controller to determine the bounds of the apparatus 1000 through which the slide 5000 may pass in the manifold.

Figure 13:
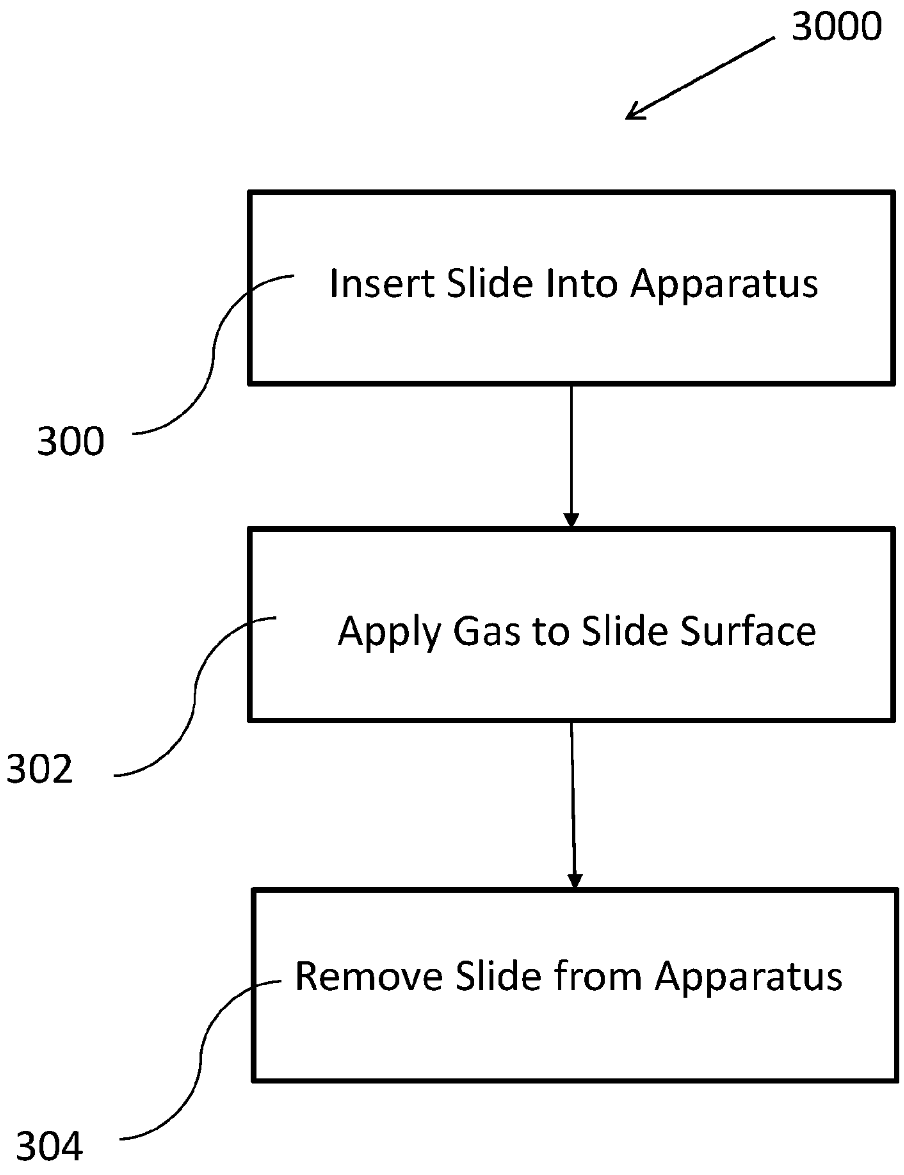
FIG. 13 is a flow chart showing steps in a method for operating the slide cleaning apparatus.

Turning to FIG. 13, a method 3000 for removing contaminants from a slide includes the step of inserting the slide into an enclosure of a slide-cleaning apparatus (step 300). This may be performed manually by having an operator insert the slide into the apparatus either using their gloved fingers, a tool or some other gripping means or by the use of a robotic arm 6000 configured to retain and transport a slide. It is envisaged that the use of a robotic arm 6000 would be preferable insofar as it allows for the efficient processing of slides without the need for an operator, particularly when part of a larger slide processing instrument. In some embodiments the slide may be deposited into the apparatus for cleaning whereas in other embodiments, such as the example described with reference to FIG. 11, a robot retains custody of the slide throughout the cleaning process.

Method 3000 includes applying a flow of gas at a predetermined pressure and/or predetermined flow rate to a surface of the slide to remove contaminants (step 302). As discussed previously, this pressure is preferably in the range of about 40 KPa to about 60 KPa and more preferably 50 KPa providing sufficient impact force or velocity to the slide surface to remove contaminants from the slide 5000, while reducing the chance of damage to the slide 5000 or a sample that is on the slide 5000. The method 3000 also includes removing the slide 5000 from the apparatus 1000 (step 304), once again, this may be performed manually or with the aid of a robotic arm 6000.

Other steps in the method may include adjusting the height of the slide 5000 for application of the gas to both the upper and lower surface of the slide 5000. Alternatively or additionally, the one or more output ports may be adjustable to facilitate the application of the gas to the upper and lower surface of the slide 5000.

In preferred embodiments, the method 3000 is performed within a sample processing instrument having a robotic arm 6000 and wherein the robot is configured to transfer a slide 5000 from a first location in the instrument into the apparatus 1000 for removal of contaminants. However, it is to be understood that this need not be the case, and that in some embodiments, the method may be performed manually, with an operator inserting the slide into the slide-cleaning apparatus 1000 for cleaning, and safely removing the slide for subsequent processing of a sample on the slide 5000.

Figure 14:
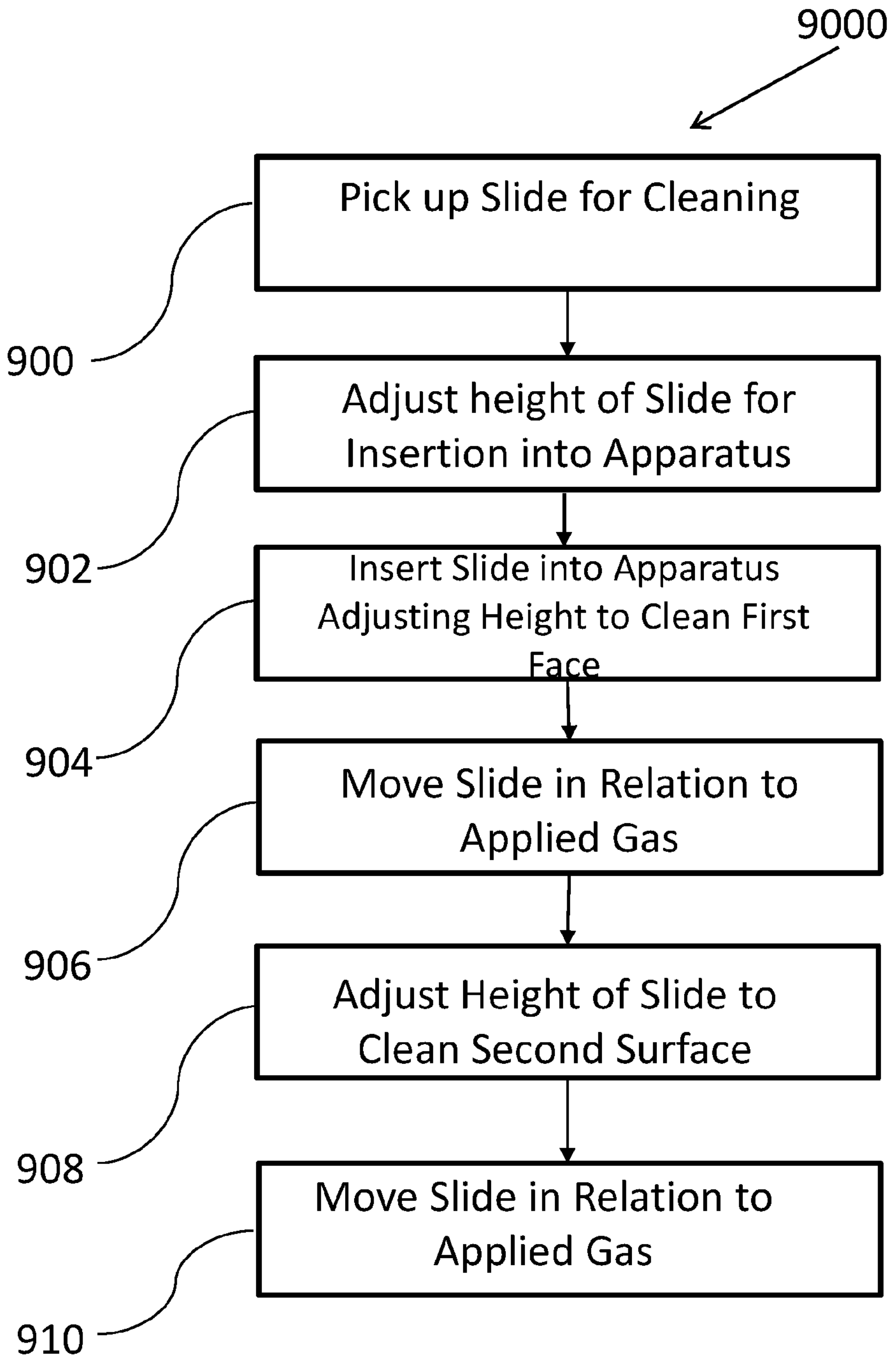
FIG. 14 is a flow chart showing steps in another method for operating the slide cleaning apparatus.

With reference to FIG. 14, a further method 9000 of removing contaminants from a slide 5000 is shown. The method 9000 includes picking up the slide for insertion into an enclosure of a slide-cleaning apparatus (step 900); adjusting a height of the slide for insertion into the slide-cleaning apparatus (step 902); inserting slide into the slide-cleaning apparatus, further adjusting the height of the slide to a height to facilitate cleaning of a first surface of the slide (step 904); moving the slide along its length capable of insertion into the slide cleaning apparatus (step 906); adjusting the height of the slide to facilitate cleaning a second surface of the slide, by applying gas to the second surface of the slide (step 908); and moving the slide in relation to the applied gas along the length of the slide (step 910).

In some embodiments, a source of gas is provided to continuously apply gas to the inserted slide 5000. In other embodiments, the application of the gas is controlled such that the gas is only applied when the slide 5000 is inserted into the apparatus 1000. The gas source may be continuous or pulsatile and applied in the form of a stream delivered via one or more slots in the manifold 1000, or a jet delivered by one or more smaller openings. The gas source controller may communicate with or be integrated into a controller of the robotic arm 6000 which transfers slides into the apparatus 1000.

In other embodiments, the height of the at least one output port 102, or angle of the gas applied to the slide 5000 is adjustable, allowing the height of the slide 5000 to remain constant throughout the cleaning process while providing for cleaning both top and bottom surfaces.

In some embodiments, where the path includes a slide height adjustment, the transit time for the slide cleaning operation may be approximately 4 to 8 seconds.

In other embodiments, the robotic arm 6000 adjusts the height of the slide 5000 before insertion of the slide 5000 into the slide-cleaning apparatus 1000.

In other embodiments, the slide robotic arm 6000 removes the slide 5000 from the apparatus.

Figure 15:
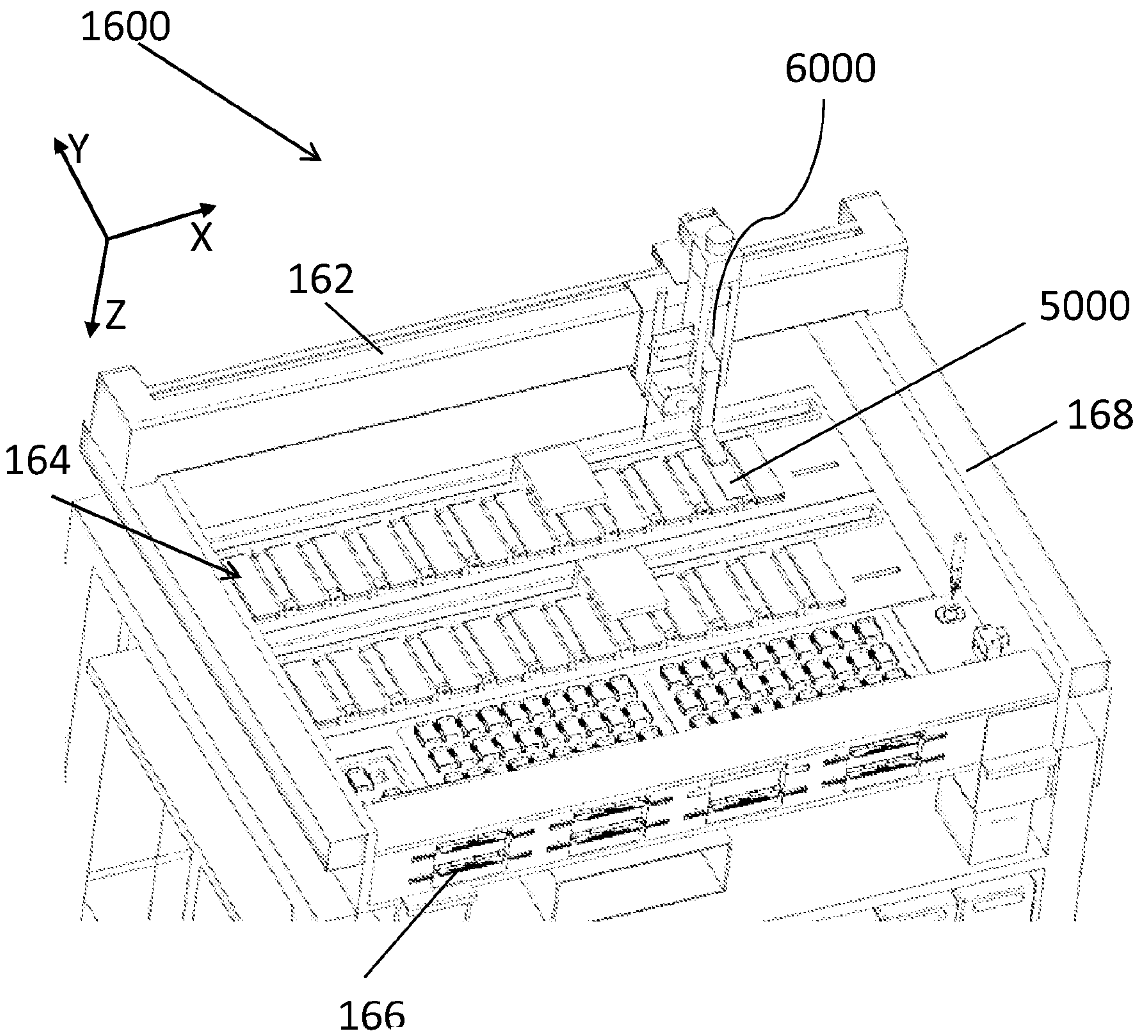
FIG. 15 is a perspective view showing internal features of an automated slide treatment instrument with which a slide cleaning apparatus according to embodiments of the present disclosure may be used.

An example of a sample processing instrument incorporating or with which the apparatus 1000 may be used according to embodiments of the present disclosure is shown in FIG. 15. Slide treatment instrument 1600 includes a plurality of slide treatment modules 164 arranged to receive the slides 5000 and includes at least one robotic arm 6000 configured by the controller to move the slides 5000 to and from the slide treatment modules 164.

It will be appreciated by those persons skilled in the art that the controller of the automated slide treatment instrument 1600 and the robotic arm 6000 can be implemented remotely from the instrument 1600 (e.g. implemented by a computer remote from the instrument) or can be implemented locally with respect to the instrument 1600 or a combination of both local and remote implementation.

In addition, more than one controller can be employed by the instrument 1600; for example, a controller for the robotic arm 6000 noting these controllers require a level of cooperation in order to coordinate slide transportation in a manner that achieves a required cleaning protocol. The one or more controllers may include a processor and a memory for storing instructions for control of the robotic arm 6000 to control movement thereof and dispensing of gas according to one or more pre-programmed treatment protocols. In some embodiments, the robotic arm 6000 includes a gantry robot configured by the controller to move the slides 5000 to and from the slide treatment modules 164. In this embodiment, the robotic arm 6000 may be combined with a fluid dispensing robot (not shown), which is configured to move in the x, y and z axes. It will be appreciated by persons skilled in the art that the robotic arm 6000 can be independent from the fluid dispensing robot. For example, the robotic arm 6000 can be an articulated armed robot while the fluid dispensing robot can be a gantry robot, and vice versa. In the embodiment shown in FIG. 15, the x axis is a length of the instrument 1600, the y axis is a width of the instrument 1600 and the z axis corresponds to a height of the instrument 1600.

As will be appreciated, the robotic arm 6000 is configured by the controller to move quickly between different zones of the instrument such as different slide treatment modules 164 and a slide cleaning apparatus 1000 provided in or associated with the instrument 1600. In the embodiment shown the robotic arm 6000 moves along a rail 162 in the x direction and a rail 168 in the y direction so as to move slides 5000 to and from the slide treatment modules 164 so as to apply a gas to the slides received in the slide treatment modules 164 although the instrument is not limited to this configuration.

FIG. 15 also shows the automated slide treatment instrument 1600 having input and output buffers in the form of an access module 166, whereby the input buffer of the access module 166 introduces slides 5000 to the instrument 1600 for treatment and the output buffer of the access module 166 allows for the removal of the slides 5000 from the instrument 1600 after cleaning of the slides 5000.

The robotic arm 6000 of the embodiment is thus further configured to retrieve a slide 5000 from the access module 166 and locate it in a slide treatment module 164 and to remove the slide 5000 from the slide treatment module 164 and locate it in the access module 166 after the cleaning process is completed. In addition, the robotic arm 6000 can also be configured to move the slide 5000 to/from other modules (not shown) for performing other operations on the slide 5000, such as cover slipping and digital imaging modules, before moving the slide 5000 to the access module 166.

Where any or all of the terms “comprise”, “comprises”, “comprised” or “comprising” are used in this specification (including the claims) they are to be interpreted as specifying the presence of the stated features, integers, steps or components, but not precluding the presence of one or more other features, integers, steps or components.

The invention claimed is:

1. An apparatus for removing contaminants from a slide, the apparatus comprising:

an enclosure that has a P-shaped profile, the enclosure comprising:

a first end opposite a second end, wherein a height of a second portion of the enclosure adjacent the second end is greater than a height of a first portion of the enclosure adjacent the first end;

a first side wall extending from the first end to the second end;

a second side wall, opposite the first side wall, extending from the first end to the second end;

an end wall on the second end connected to the first side wall and the second side wall;

a top wall extending from the first end to the second end, wherein the top wall is connected to the first side wall, the second side wall, and the end wall;

a bottom wall, opposite the top wall, extending from the first end to the second end, the bottom wall comprising:

a first portion of the bottom wall in the first portion of the enclosure; and a second portion of the bottom wall in the second portion of the enclosure;

wherein the bottom wall is connected to the first side wall, the second side wall, and the end wall, and wherein the first portion of the bottom wall is closer to the top wall than the second portion of the bottom wall, and wherein at least one of the walls of the enclosure includes an opening; and a manifold connected to, and framing, a portion of the first end of the enclosure, the manifold comprising:

first and second vertical walls and a horizontal wall connected between lower portions of the first and second vertical walls, defining an opening between the first and second vertical walls above the horizontal wall that is configured to receive the slide into the enclosure;

an input port in the horizontal wall for receiving a flow of gas from a gas source; and at least one output port in at least one of the first and second vertical walls, wherein the at least one outport port is fluidically connected to the input port so that gas from the gas source can be directed onto a surface of the slide from the output port when the slide is received into the enclosure through the opening formed by the first and second vertical walls.

2. The apparatus of claim 1, wherein the enclosure is removably attachable to the manifold at the first end of the enclosure by way of a friction fit attachment.

3. The apparatus of claim 1, wherein the at least one output port comprises:

one or more nozzles each having a diameter of about 0.5 mm to about 1.5 mm; or one or more nozzles each having a diameter of about 1 mm.

4. The apparatus of claim 3, wherein the input port is adapted to removably receive a gas line.

5. The apparatus of claim 4, wherein the flow of gas at the input port has a pressure of between about 40 KPa and about 60 KPa.

6. The apparatus of claim 1, wherein at least one of the openings in walls of the enclosure contains a mesh configured to intercept particulate contaminates removed from the slide.

7. The apparatus of claim 6, wherein:

the mesh is comprised of apertures configured to intercept particles having a size greater than about 0.4 mm; and/or the mesh is removable from the at least one opening of the enclosure; and/or the mesh is constructed of stainless steel or a polymer.

8. The apparatus of claim 1, including a guide structure extending from the bottom wall at the first end of the enclosure.

9. The apparatus of claim 8, wherein the guide structure comprises opposing ledges or slots.

10. The apparatus of claim 1, further comprising a mounting means for mounting the apparatus to a base plate.

11. The apparatus of claim 10, wherein:

the mounting means comprises two or more recesses on the manifold configured to receive mounting projections within the base plate; or the mounting means comprises two or more projections on the manifold configured to cooperate with two or more recesses on the manifold.

12. The apparatus of claim 1, wherein the gas is ionized.

13. A method for removing contaminants from a slide, the method comprising the steps of:

inserting the slide through an opening between first and second vertical walls of a manifold into a first end of an enclosure, wherein the enclosure extends from the first end to a second end, wherein a height of a second portion of the enclosure adjacent the second end is greater than the height of a first portion of the enclosure adjacent the first end, and wherein the manifold has at least one output port in at least one of the first and second vertical walls through which gas can flow;

directing a flow of gas, at a predetermined pressure, through the at least one output port of the manifold onto a first surface of the slide;

removing, by the flow of gas, contaminants present on the first surface of the slide;

collecting removed contaminants in a basin formed by the second portion of the enclosure; and removing the slide from the first end of the enclosure.

14. The method of claim 13, further including the step of adjusting a height of the slide for insertion into the enclosure.

15. The method of claim 13, wherein the predetermined pressure is between about 40 KPa and about 60 KPa.

16. The method of claim 13, wherein the enclosure includes at least one mesh portion, the method further comprising:

dispersing the flow of gas through the at least one mesh portion of the enclosure.

17. The method of claim 13, wherein inserting the slide through the opening between first and second vertical walls of the manifold into the first end of the enclosure and removing the slide from the first end of the enclosure is performed by a slide handling robot.

18. The method of claim 14, further comprising the steps of, after directing the flow of gas to the first surface of the slide, and before removing the slide from the first end of the enclosure:

moving the slide in relation to the applied gas along a length of the enclosure; and adjusting the height of the slide to a height to facilitate cleaning a second surface of the slide, by applying gas to the second surface of the slide.

19. The method of claim 17, the method further comprising:

adjusting, by the slide handling robot, a height of the slide inside the enclosure relative to a top wall of the enclosure.

* * * * *